Sept. 17, 1968

B. J. MIDDLESWORTH 3,401,890

SPREADER AND SPRAYER COMBINATION

Filed May 10, 1965

Inventor:
Billy J. Middlesworth,
by Hood, Gust & Irish
Attorneys.

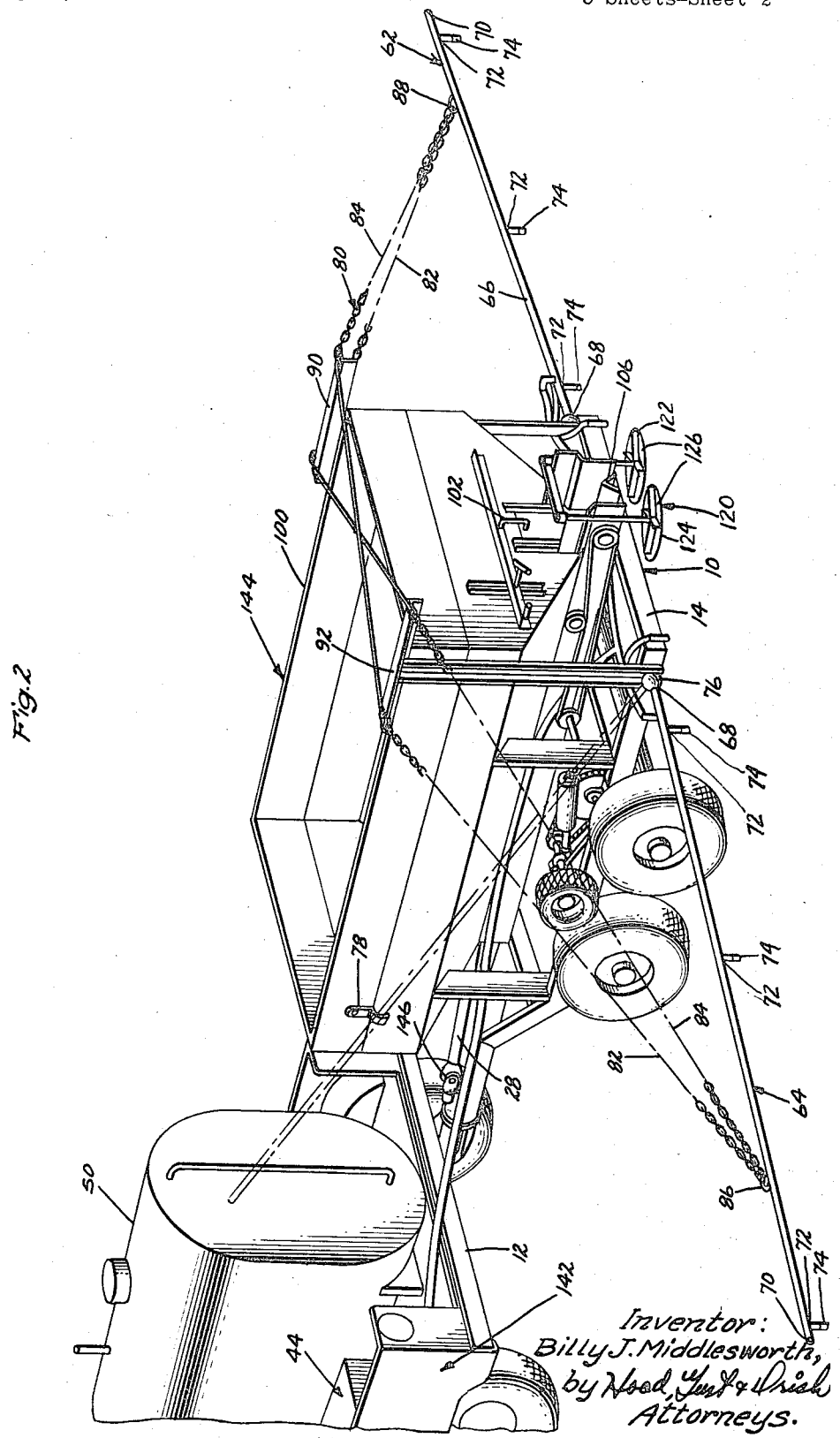

Sept. 17, 1968 B. J. MIDDLESWORTH 3,401,890
SPREADER AND SPRAYER COMBINATION
Filed May 10, 1965 5 Sheets-Sheet 3
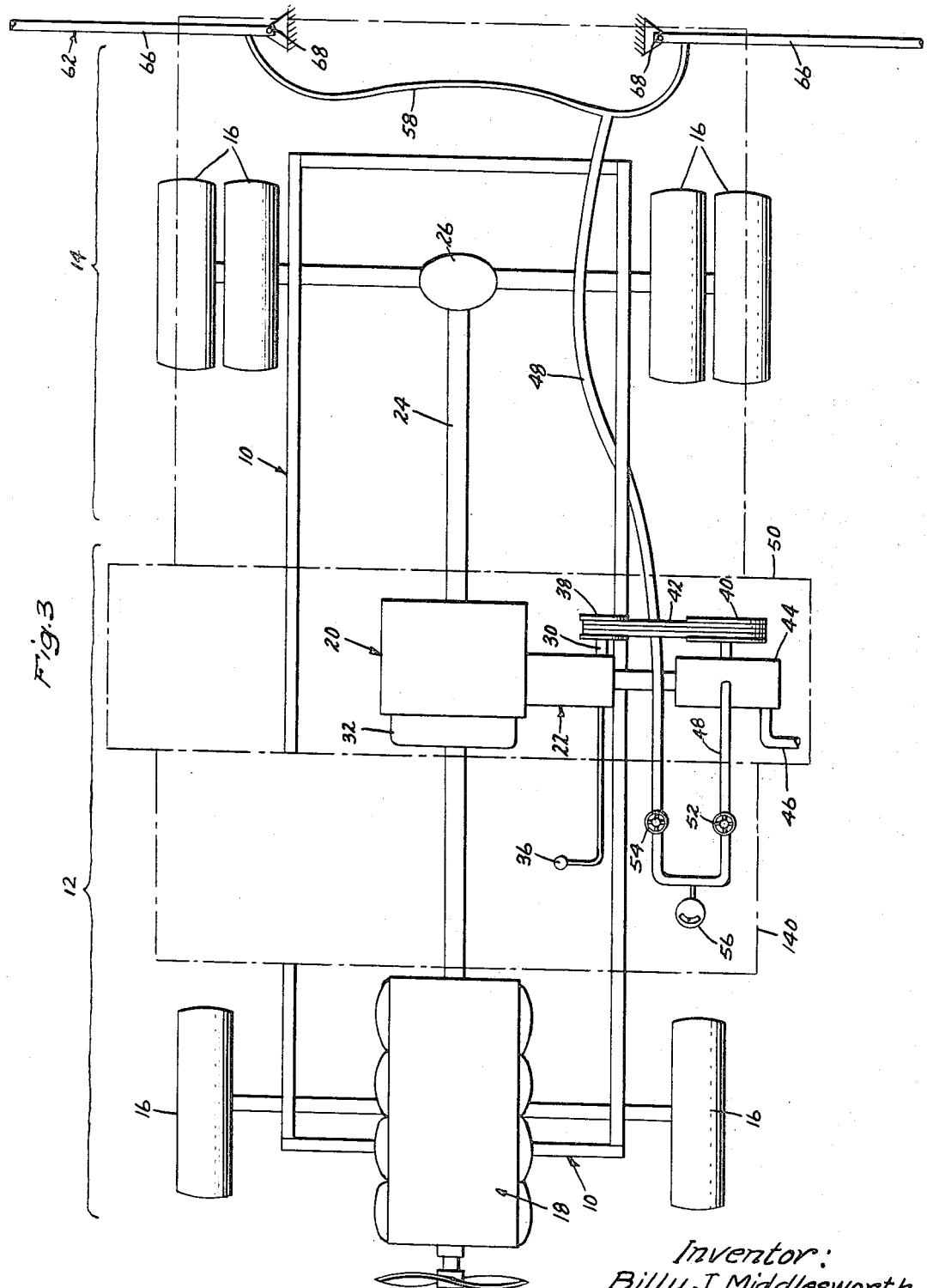

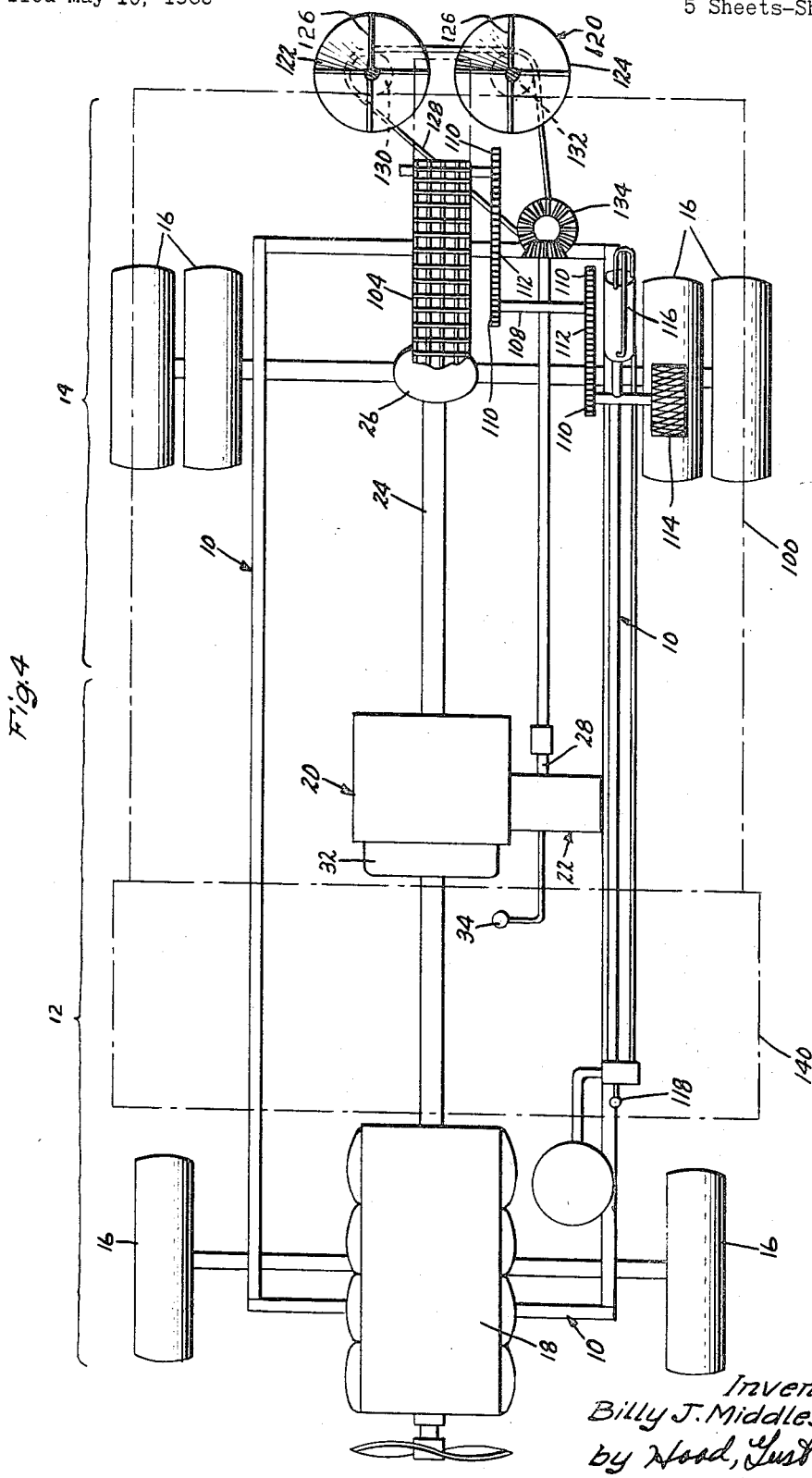

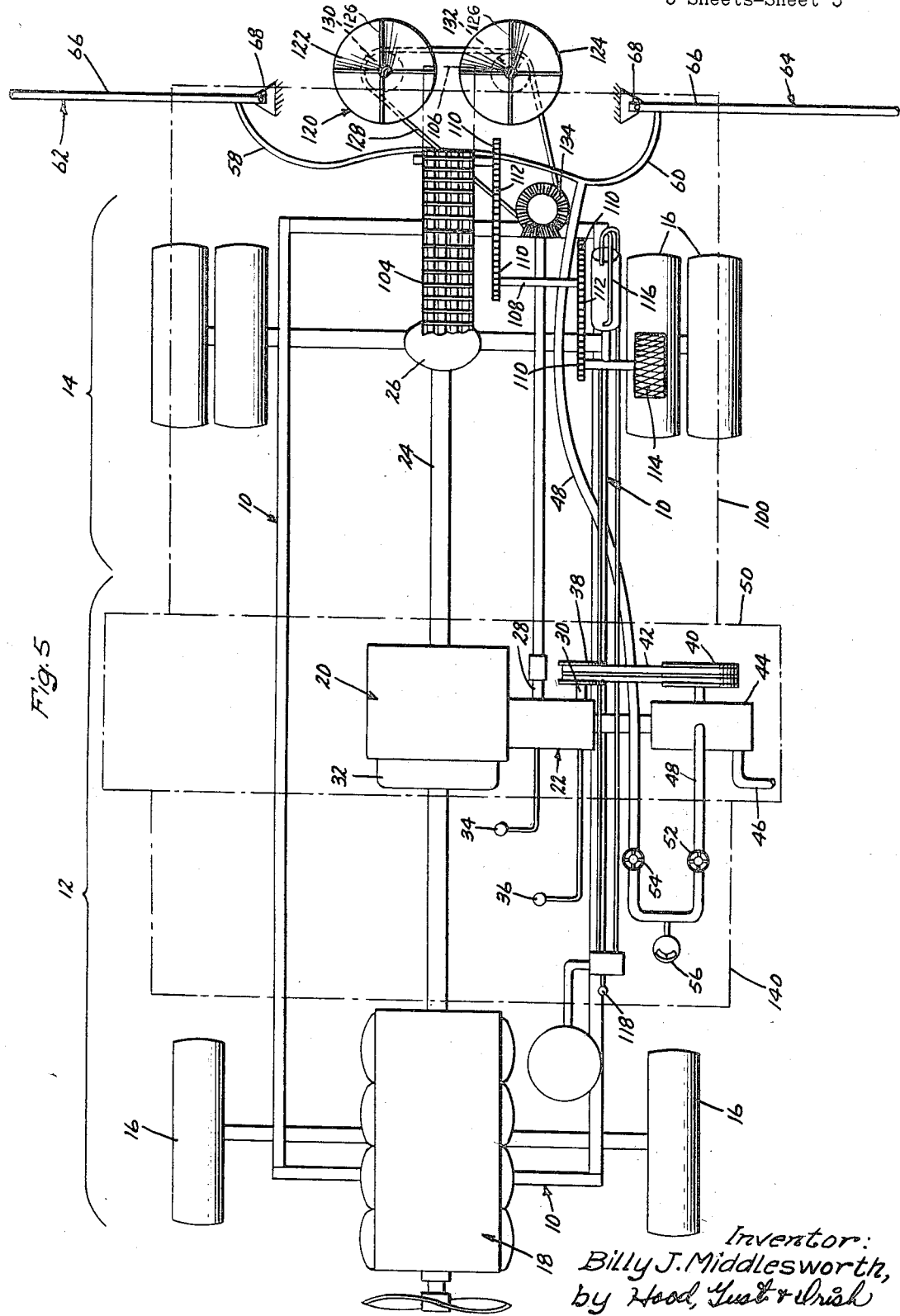

United States Patent Office 3,401,890
Patented Sept. 17, 1968

3,401,890
SPREADER AND SPRAYER COMBINATION
Billy J. Middlesworth, R.R. 2, Greentown, Ind. 46936
Filed May 10, 1965, Ser. No. 454,384
2 Claims. (Cl. 239—670)

ABSTRACT OF THE DISCLOSURE

A combined spreader and sprayer mounted on a wheel-supported frame and connected to a common power unit. Means is provided for operating the spreader and sprayer either separately or in combination with each other. The sprayer has two booms extending from the frame in opposite directions and the spreader has a dispersing mechanism. Both the booms and the dispersing mechanism, in a specific embodiment, are positioned rearward of the frame supporting wheels. The sprayer booms are mounted to the frame in a manner allowing universal swivelling movement of the booms with respect to the frame. Storage means for both the material dispersed by the spreader and sprayer are mounted on the frame and respectively connected to the spreader and sprayer.

---

The present invention relates generally to an improved device for spraying liquids and spreading particled solids, and, more particularly, to an improved fertilizer spreader and sprayer apparatus whereby liquid fertilizer and solid fertilizer can be dispersed over an area simultaneously.

Heretofore, numerous devices have been proposed which successfully either spray liquid fertilizer or spread solid fertilizer. However, currently, a great variety of fertilizers, in both liquid and solid forms, each of which has a rather specific beneficial effect on the soil to which it is applied, and a large assortment of other agricultural chemicals such as weed killers and the like, are available making it desirable that an apparatus be provided which can simultaneously spread particled solids and spray liquids over the same area. Prior devices that have been proposed, while they may be capable of dispersing both liquids and solids, cannot disperse both forms of agricultural chemicals simultaneously, and therefore, require that the apparatus be passed over the same area each time a different form of agricultural chemical is desirably applied. It is therefore desirable to provide an apparatus which can spray liquids and disperse particled solids simultaneously thereby eliminating the need for repetitive applications when a liquid chemical and a particled solid chemical are desirably used in combination.

It is therefore an object of this invention to provide an improved apparatus which can simultaneously spray a liquid and spread a particled solid over the same general area.

A further object of this invention is to provide an improved apparatus having a boom-type sprayer and a rotating particle disperser which can be operated simultaneously or independently of each other.

Still further an object of this invention is to provide an improved apparatus having a boom-type sprayer, a rotating particle disperser, and a particle conveyor communicating with the disperser, each of which can be operated simultaneously or independently of each other.

The above-mentioned and other features and objects of this invention and the manner of attaining them will become more apparent and the invention itself will be best understood by reference to the following description of an embodiment of the invention taken in conjunction with the accompanying drawings, wherein:

FIG. 2 is a perspective view of another embodiment of the improved spreader and sprayer combination of this invention;

FIG. 3 is a diagrammatic illustration of the sprayer apparatus of this invention;

FIG. 4 is a diagrammatic illustration of the spreader apparatus of this invention; and FIG. 5 is a diagrammatic illustration of the combined sprayer and spreader apparatus of this invention.

Figure 1:
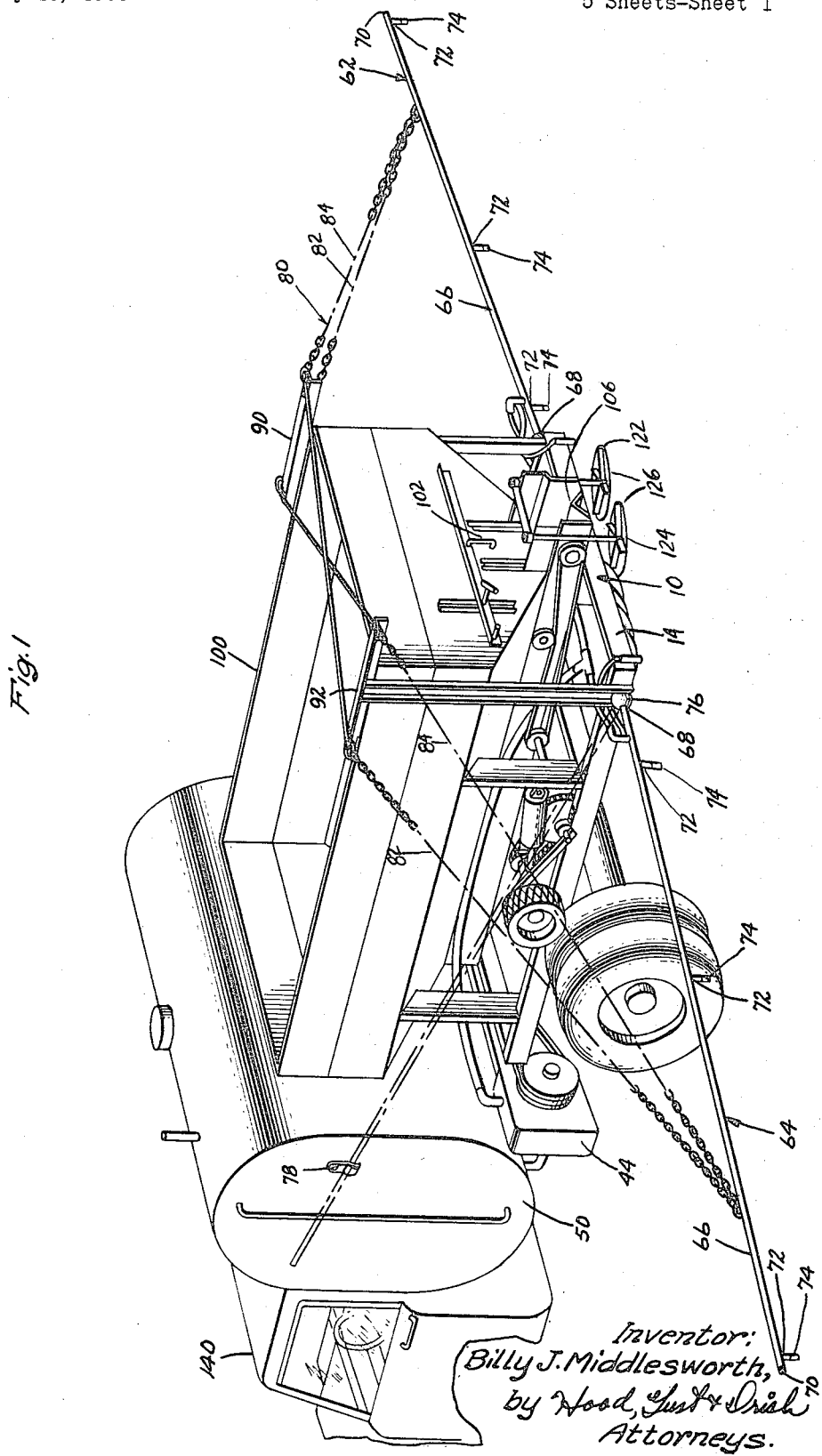
FIG. 1 is a perspective view of one embodiment of the improved sprayer and spreader combination of this invention.

In the broader aspects of this invention there is provided a combination sprayer and spreader apparatus comprising an elongated frame supported by ground wheels, a power means secured to the frame and having a pair of shafts extending therefrom which are selectively rotatable independently of each other, a spraying means including a pump driven by one of the shafts and a spray boom swivelly connected to the frame, supporting means for supporting the boom in a generally horizontal position transverse to the frame, and a spreading means including a particle disperser connected to the frame and driven by the other of the shafts and a conveyor communicating with the disperser and driven independently of the pump and disperser.

Referring now to the drawings, and more specifically to the diagrammatic illustrations shown in FIGS. 3, 4 and 5, there is shown a conventional frame 10 having a front portion 12 and a rear portion 14 which is supported by the ground wheels 16. Secured to the front portion 12 of the frame 10 is an engine 18, a transmission 20, and a power take-off unit 22. The transmission 20 is connected to the engine 18 in any conventional manner and is in turn connected to the rear ground wheels 16 by means of a drive shaft 24 and a differential 26. The power take-off unit 22 is shown to be adjacent the transmission 20, however, there are several conventional types of power take-off units, each of which are connected to either the transmission 20 or the drive shaft 24, which are satisfactory. Whichever type of power take-off unit 22 is used, the power take-off unit must have a pair of shafts 28, 30 extending therefrom which are selectively rotatable independently of each other. The specific power take-off unit 22 illustrated is operatively connected to a clutch mechanism 32 and a transmission 20 whereby each of the shafts 28, 30 can be selectively rotatable independently of the other shaft by means of controls 34, 36, respectively, which are located in the operator's cab of the vehicle being described.

Now referring specifically to FIG. 3 which diagrammatically illustrates the structure of the sprayer portion of the apparatus of this invention, there is shown a pump 44 operatively connected to shaft 30 by means of a series of pulleys 38, 40 and a continuous belt 42. Pump 44 has an inlet conduit 46 and an outlet conduit 48 and is likewise secured to the front portion 12 of frame 10. Positioned over the transmission 20, power take-off unit 22 and the pump 44, and secured to the frame 10, is a storage tank 50. Tank 50 is connected to and communicates with inlet conduit 46 whereby operation of pump 44 functions to discharge the contents of the tank 50 through the outlet conduit 48. Positioned in the outlet conduit 48 is a diaphragm valve 52, a quick shut-off valve 54 and a pressure gauge 56 therebetween. Valves 52, 54 and pressure gauge 56 are all located adjacent to controls 34, 36 in the operator's cab 140. Outlet conduit 48 is extended from the pump 44 lengthwise of the frame 10 to a position adjacent the rear of the frame 10 where the outlet conduit 48 communicates with two lengths of conduit 58, 60, the purpose of which will be described hereinafter.

Swivelly connected to the rear portion 14 of frame 10 adjacent the opposite rear corners thereof, respectively, are two sprayer booms 62, 64. Sprayer booms 62, 64 are shown only diagrammatically in FIGS. 3 and 5; and therefore, reference is now made to FIGS. 1 and 2 which show the precise structure. Booms 62, 64 each comprise an elongated tube 66 having opposite ends 68, 70 and each has a plurality of spaced apart discharge openings therein. Secured in each of the discharge openings 72, respectively, are a plurality of nozzles 74. Tubes 66 are closed at both ends 68, 70 and ends 68 of the respective tubes 66 are swivelly secured to the frame 10 as above-mentioned by means of a ball joint 76. Communicating with the tubes 66 adjacent ends 68 are conduits 58, 60, above-mentioned, which also communicates with the outlet conduit 48. Thus assembled and secured to frame 10, booms 62, 64 are movable from a first position (illustrated in FIGS. 1 and 2 in solid lines) in which booms 62, 64 are generally horizontal and generally transverse to frame 10 to a second position (shown in dotted lines in FIGS. 1 and 2) which is generally perpendicular to the first position above-mentioned, and in which booms 62, 64 are angularly disposed to the horizontal. Secured to the tank 50, in the first embodiment, and to the storage bin 100 which will be mentioned hereinafter with reference to the second embodiment, is a bracket 78 which secures booms 62, 64 in the aforementioned second position.

Still referring to FIGS. 1 and 2, there is shown a flexible support means 80 comprising two lengths of chain, wire, cable or the like, 82, 84, which are secured at opposite ends thereof to the respective booms 62, 64 at a position 86, 88, respectively, which is located intermediate the ends 68, 70 of the booms 62, 64, respectively. Intermediate their connections at positions 86, 88, flexible supports 82, 84 are supported by T-shaped support members 90, 92 which are secured to frame 10 in a generally vertical manner thereby supporting members 82, 84 between the booms 62, 64 in a manner to support booms 62, 64 in the first position above-mentioned. Members 82, 84, being flexible, merely hang from the respective booms 62, 64 whenever booms 62, 64 are folded into the above-mentioned second position and secured by bracket means 78.

Referring now to FIG. 4, which diagrammatically illustrates the spreader apparatus, there is shown secured to the rear portion 14 of the frame 10 and over the differential 26 a storage bin 100 for particled solids, shown in dotted lines. Storage bin 100 has a discharge opening 102 at the rear end thereof and a conveyor 104 mounted within the storage bin 100 adjacent the bottom thereof (not shown). Conveyor 104 has one end 106 thereof which extends through the discharge opening 102 and extends to a position rearward of bin 100 and the frame 10. Conveyor 104 may be conventional in all respects and need only be chosen of a type that is successively operable with the storage bin 100 to dispense particled solids from the bin 100 whenever the conveyor 104 is operated. Conveyor 104 is driven by means of a pulley and belt linkage 108 comprising pulleys 110 and continuous belts 112 which connect the conveyor 104 to a wheel 114. Wheel 114 is rotatably and hingedly secured to the frame 10 adjacent to one of the ground wheels 16 in such a manner that wheel 114 is selectively movable into and out of peripheral engagement with one of the ground wheels 16 above-mentioned. Means is provided to insure engagement between the wheel 114 and the wheel 16 which can be mechanically actuated such as by use of a lever (not shown) or, as illustrated in the figures, hydraulically actuated by means of an air cylinder 116, which is operatively connected to the hydraulic system of the truck conventionally provided for air brakes, and which is actuated by means of a control lever 118 located in the cab portion of the vehicle. Air cylinder 116 moves the wheel 114 from the position out of contact with the wheel 16 illustrated in FIGS. 1 and 2 into peripheral engagement with the wheel 16, the latter position not being shown.

Secured to frame 10 and beneath the terminal end 106 of the conveyor is a particle disperser 120 comprising two disc-shaped spinners 122, 124 which are rotatably mounted on frame 10 on vertical axes and have radially aligned veins 126 attached to their upwardly facing surface. In the specific embodiment illustrated in FIGS. 1 and 2, four veins 126 are secured at ninety degree intervals to each of the spinners 122, 124. Spinners 122, 124 are driven by a continuous belt 128 which is extended between pulleys 130, 132, which are connected to the spinners 122, 124, respectively, and a pulley 134 which is geared to the shaft 28 of the power take-off unit 22. As aforementioned, shaft 28 is selectively rotatable independent of shaft 30 by actuating control 34.

Now referring to FIG. 5, there is diagrammatically illustrated the combination sprayer and spreader of this invention showing the apparatus of both the sprayer and the spreader and the interrelation therebetween. All of the apparatus shown in FIG. 5 is also shown in either of the FIGS. 3 and 4 which, as above-mentioned, illustrate the apparatus of the sprayer and the spreader, respectively.

Referring now to FIGS. 1 and 2, the differences between the embodiment shown in FIG. 1 and the embodiment shown in FIG. 2 will now be mentioned. Each of the embodiments illustrated comprise similar apparatus mounted on the frame 10 in similar manner. Referring to the first embodiment of this invention, illustrated in FIG. 1, the frame 10 is a frame of a conventional truck and thereby is continuous in length. The tank 50 is secured transversely of the frame 10 and adjacent to the cab portion of the truck which is given a reference numeral of 140 for purposes of clarity. Directly behind tank 50 is secured to the frame 10, longitudinally of the frame 10, the storage bin 100. Further, in the first embodiment of this invention, the pump 44 is secured to the frame 10 to one side of the frame 10 intermediate the tank 50 and the bin 100. Except for these precise locations of the tank 50, the bin 100 and the pump 44, the structure of the first embodiment of this invention is substantially the same as above-described.

Now referring to FIG. 2, which illustrates the second embodiment of this invention, there is shown a conventional pick-up truck and trailer combination having a frame 10 which is discontinuous. The frame 10 in this embodiment has a front portion 12 which is the frame of the pick-up truck, which will be given the reference numeral 142 for clarity, and a rear frame portion 14 which is the frame of the trailer 144. Front frame portion 12 and rear frame portion 14 are coupled together therebetween to form frame 10. As illustrated, tank 50 is secured to the front frame portion 12 in the load carrying portion of the pick-up 142 in longitudinal alignment with the frame portion 12. Also, the pump 44 is located in the load carrying portion of the pick-up adjacent to the tank 50. Bin 100 is secured to the rear frame portion 14 of the frame 10 longitudinally thereof in substantially the same manner as in the first embodiment. However, since the front frame portion 12 and the rear frame portion 14 are coupled together and capable of movement therebetween, shaft 28 extending from the front frame portion 12 to the rear frame portion 14 to drive the spinners 122, 124 has a universal joint 146 therein. The only remaining difference in the second embodiment when compared to the first embodiment of this invention is the fact that the rear portion 14 of the frame 10 is supported by four wheels rather than the dual wheeled structure of the first embodiment.

In operation, the device of both embodiments of this invention shown in FIGS. 1 and 2 operate similarly; and therefore, the description of operation of this invention hereinbelow will be understood to be general to both embodiments even though the reference numerals will refer specifically to the first embodiment of this invention. Preparatory to use, the booms 62, 64 of this invention are disengaged from the bracket portions 78 secured to the tank 50 and are positioned in their extended position illustrated in FIG. 1. Thus supported, the nozzles 74 depend downwardly therefrom. The apparatus of this invention is then moved over the ground desirably treated with both liquid and particled solids and the control 34 is actuated. The actuation of control 34 starts the spinners 122, 124 rotating. Then the control 118 is actuated thereby energizing the air cylinder 116 and forcibly engaging the wheel 114 to the ground wheel 16. By such engagement, the ground wheel 16, which is rotating, imparts rotary movement to the wheel 114 and by the linkage 108 drives the conveyor 104. The conveyor 104 now being in operation conveys from the bin 100 the particled solids contained therein and discharges the solids by means of gravity onto the spinners 122 and 124, which disperse the solids in radial directions therefrom. By actuating control 36, pump 44 is put into operation. Pump 44 functions to empty the contents of tank 50 through conduit 48, and into tubes 66 of the respective booms 62, 64. This liquid is ejected from nozzles 74 in a spray which is directed downwardly and nozzles 74 are chosen such that there is a slight overlapping between the spray of liquid emanating from adjacent nozzles thereby covering substantially the area on either side of the apparatus. Spinners 122, 124 are also chosen such that the particled solids dispersed therefrom generally cover the same area as the spray emanating from the nozzles 74.

In operation, whenever particled solids are desirably dispersed singularly or whenever a liquid is desirably used in preference to particled solids, the spreader apparatus diagrammatically illustrated in FIG. 3 and the sprayer apparatus diagrammatically illustrated in FIG. 4 can be operated independently of each other, respectively. For example, by actuating controls 34, 118 without actuating control 36, only the spreader apparatus of this invention is in operation. Likewise, whenever control 36 is actuated and controls 34, 118 are not actuated, only the sprayer device of this invention is in operation.

In a specific embodiment, the conveyor 104, above-described as conventional, can be of a variety of types. While a chain conveyor is illustrated in the figures, a screw conveyor could also be satisfactorily used. Further, while particle disperser 120 is illustrated in the drawings and above-described to comprise two disc-shaped spinners 122, 124, in a specific embodiment, particle disperser 120 can comprise only a single disc-shaped spinner, such as that referred to by the reference numerals 122, 124.

While there have been described above the principles of this invention in connection with specific apparatus, it is to be clearly understood that this description is made only by way of example and not as a limitation to the scope of this invention.

What is claimed is:

1. A combined spreader and sprayer comprising a vehicle having a frame supported by ground wheels, said frame having a front and a rear portion, said front frame portion having secured thereto a power unit, said power unit having a pair of shafts extending therefrom, a clutch mechanism operatively connected to said shafts whereby said shafts are selectively rotatable independently of each other, a pump having an inlet and an outlet conduit, said pump being operatively connected to one of said shafts, power means including said power unit for selectively driving said pump, a liquid storage tank secured to said frame, said inlet conduit connected to said tank, a sprayer boom having at least one elongated tube with opposite ends and a plurality of spaced-apart discharge openings therein, said outlet conduit of said pump connected to said tube adjacent to one of said tube ends, said one tube end being swivelly connected to said frame in a manner allowing universal swivelling movement between said tube and said frame, said tube being movable with respect to said frame from a first position in which said boom is generally horiontal and generally transverse to said frame and said nozzles depend from said boom in a downward direction to a second position generally perpendicular to said first position in which said boom is angularly disposed to the horizontal, support means connected to said frame and said boom intermediate said tube ends for flexibly supporting said boom in said first position, means for securing said boom to said frame when said boom is in said second position, a storage bin for particled solids secured to said frame and having a discharge opening, conveyor means within said bin and having one end thereof extending through said discharge opening to a position rearward of said bin, conveyor operating means including a wheel rotatably and hingedly secured to said frame and movable into and out of peripheral engagement with one of said ground wheels and means for selectively and forcibly engaging said wheel and one ground wheel for selectively conveying said particled solids from said bin whenever said wheel is in contact with said ground wheel and rotated, and a particle dispersing means mounted on said frame beneath said discharge opening, said dispersing means being operatively connected to said other shaft of said power unit, whereby said liquid and said particled solid may be selectively dispersed conjointly or separately.

2. The combination of claim 1 wherein said sprayer boom has two of said elongated tubes, said tubes respectively extending outwardly from opposite sides of said vehicle when in said first position, said tubes and said dispersing means both being rearward of said ground wheels of said vehicle.

References Cited

UNITED STATES PATENTS

| | | | |
|---|---|---|---|
| 1,613,051 | 1/1927 | Napier | 94—44 |
| 1,633,294 | 6/1927 | Stubenberg | 239—167 |
| 2,725,256 | 11/1955 | Devost et al. | 239—167 |
| 3,199,423 | 8/1965 | Dickey | 239—159 X |
| 3,220,740 | 11/1965 | Kavan et al. | 275—8 X |
| 1,610,556 | 12/1926 | Kirkland | 239—168 |
| 2,619,379 | 11/1952 | Skifte | 239—168 |
| 2,684,865 | 7/1954 | Lattner | 239—168 |

FOREIGN PATENTS 154,283  11/1953  Australia.

M. HENSON WOOD, JR., *Primary Examiner.*

V. C. WILKS, *Assistant Examiner.*